US011163587B2

(12) United States Patent
Miner et al.

(10) Patent No.: US 11,163,587 B2
(45) Date of Patent: Nov. 2, 2021

(54) INTERFACE THAT ENABLES STREAMLINED USER-FRIENDLY INITIATION/CONTROL OF MODIFICATIONS AND/OR INITIAL PROGRAM LOADING (IPL) OF A TARGET SYSTEM

(71) Applicant: International Business Machines Corporation, Armonk, NY (US)

(72) Inventors: Kevin L. Miner, Apopka, FL (US); Trinh Nguyen, San Jose, CA (US); Camvu Pham, San Jose, CA (US); Bard Allen Doster, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 16/596,442

(22) Filed: Oct. 8, 2019

(65) Prior Publication Data

US 2021/0103448 A1 Apr. 8, 2021

(51) Int. Cl.
*G06F 9/00* (2006.01)
*G06F 9/445* (2018.01)
*G06F 9/48* (2006.01)
*G06F 9/451* (2018.01)

(52) U.S. Cl.
CPC ............ *G06F 9/4451* (2013.01); *G06F 9/453* (2018.02); *G06F 9/485* (2013.01)

(58) Field of Classification Search
CPC .................................................. G06F 9/5441
USPC .......................................................... 713/1
See application file for complete search history.

(56) References Cited

U.S. PATENT DOCUMENTS

| 8,464,246 B2 | 6/2013 | Davies et al. |
| 8,584,117 B2 | 11/2013 | Davies |
| 2010/0036940 A1* | 2/2010 | Carey .................. G06F 15/173 709/224 |

(Continued)

OTHER PUBLICATIONS

Anonymous, "An IoT System that Combines Externally Sourced and Public Sensor Data with Internal Enterprise Sensor Data for Action Determination," IP.com Prior Art Database, Technical Disclosure No. IPCOM000255135D, Sep. 4, 2018, 23 pages.

(Continued)

*Primary Examiner* — Timothy A Mudrick
(74) *Attorney, Agent, or Firm* — Zilka-Kotab, P.C.

(57) ABSTRACT

A computer-implemented method according to one embodiment includes outputting an interface, receiving a first input and parsing contents of the first input. It is determined whether the first input includes the instances of information: a type of modification that is to be performed, a program that is to be incorporated in the performing of the modification, and a target system on which the modification is to be performed. In response to a determination that the first input does not include one or more of the instances of information, a request is output. In response to a determination that the first input includes the instances of information, a process is performed. The process includes correlating the instances of information to a script file and performing the modification in accordance with the instances of information of the first input. The process further includes collecting status information and outputting the status information.

20 Claims, 9 Drawing Sheets

(56) References Cited

U.S. PATENT DOCUMENTS

| | | | |
|---|---|---|---|
| 2010/0058356 A1* | 3/2010 | Aho | G06F 9/455 |
| | | | 719/313 |
| 2010/0191923 A1* | 7/2010 | Archer | G06F 12/1036 |
| | | | 711/154 |
| 2010/0251029 A1* | 9/2010 | Agha | G06F 11/2284 |
| | | | 714/40 |
| 2018/0081846 A1* | 3/2018 | Compton | G06F 13/4027 |
| 2018/0157422 A1* | 6/2018 | Greer | G06F 11/3668 |

OTHER PUBLICATIONS

Anonymous, "System for Detecting and/or Locating Portable Objects using Beacon Devices," IP.com Prior Art Database, Technical Disclosure No. IPCOM000255137D, Sep. 4, 2018, 22 pages.

Anonymous, "Augmented Intelligence Remote Assistant for IT Support," IP.com Prior Art Database, Technical Disclosure No. IPCOM000255246D, Sep. 11, 2018, 7 pages.

IBM, "Planning for Installation z/OS: Version 2 Release 3," International Business Machines Corporation, 2019, pp. 1-165.

Winnard et al., "Mainframe from Scratch Hardware Configuration and z/OS Build," IBM Redbooks, Dec. 2016, pp. 1-262.

Brody, B., "A System Programmer Productivity Tool Bag," IBM, PowerPoint Session 12716, Feb. 2013, pp. 1-267.

\* cited by examiner

INTERFACE THAT ENABLES STREAMLINED USER-FRIENDLY INITIATION/CONTROL OF MODIFICATIONS AND/OR INITIAL PROGRAM LOADING (IPL) OF A TARGET SYSTEM

BACKGROUND

The present invention relates to interfaces, and more specifically, this invention relates to an interface for enabling initiation/control of modifications and/or IPL processes of a target system.

Interfaces are visual outputs that may be displayed on a device. Such interfaces may differ in contents and/or appearance depending on any number of variables, e.g., use case(s), user access restrictions, device constraints, etc.

Some user interfaces are configured to, via a display displaying the user interface, allow user input thereon. In some cases, interfaces are modified depending on the contents of received user inputs. In one specific example, as a result of ongoing updating of an interface, users may perceive that they are interacting with artificial intelligence.

SUMMARY

A computer-implemented method according to one embodiment includes outputting an interface to a first destination, receiving a first input from a user and parsing contents of the first input. The interface includes a feature configured to accept user input. It is determined, using the parsed contents of the first input, whether the first input includes the following instances of information: a type of modification that is to be performed, a program that is to be incorporated in the performing of the modification, and a target system on which the modification is to be performed. In response to a determination that the first input does not include one or more of the instances of information, a request is output for the instance(s) of information not included in the first input. In response to a determination that the first input includes the instances of information, a process is performed. The process includes correlating the instances of information to a script file that is pre-associated with the program indicated in the instances of information, and performing the modification in accordance with the instances of information of the first input by initiating running of the script file. The process further includes collecting status information detailing the modification being performed, and outputting the status information to the first destination.

A computer program product for outputting an interface that enables streamlined user-friendly initiation/control of modifications and/or initial program loading of a target system, according to another embodiment, includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
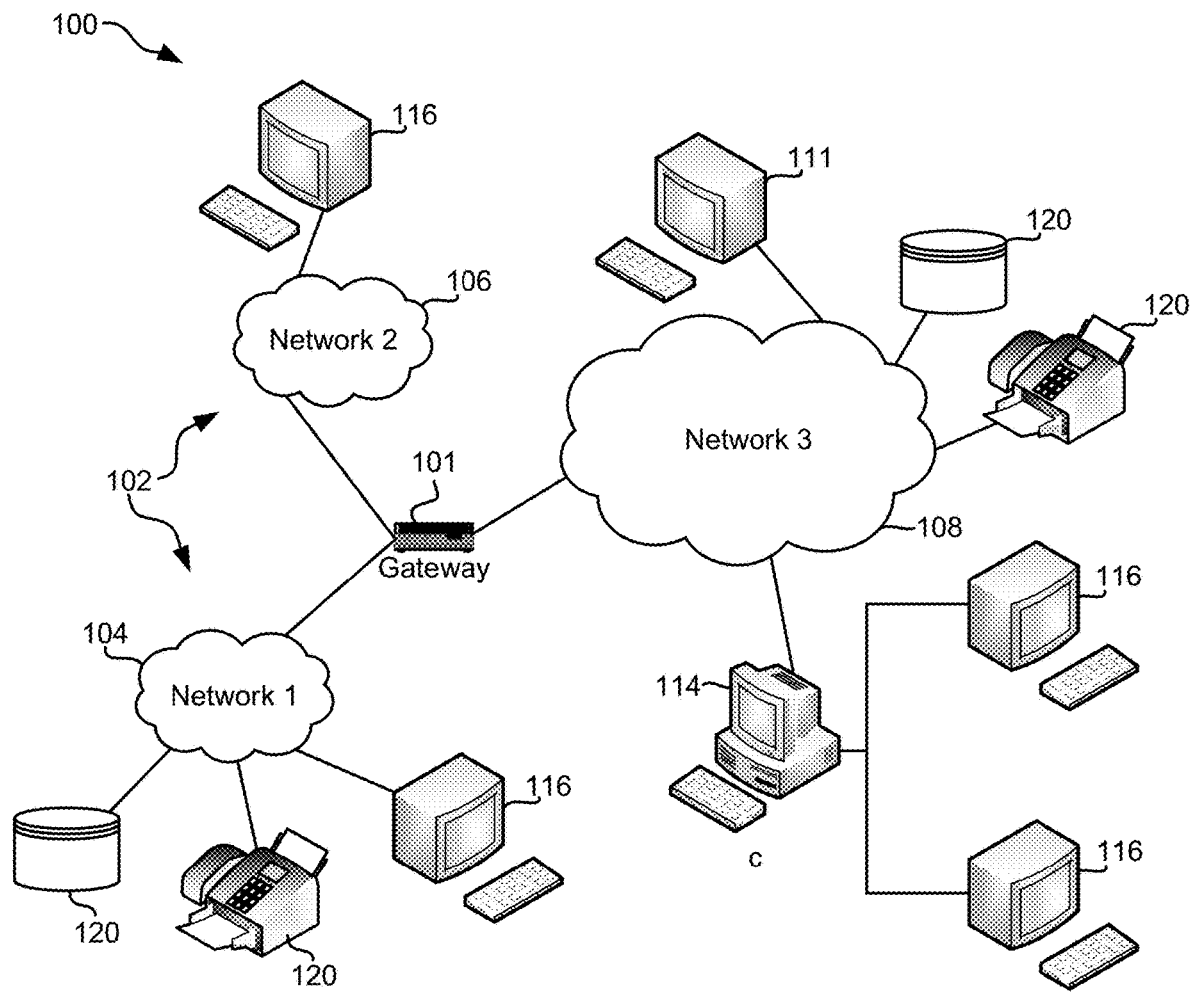
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for outputting an interface that enables streamlined user-friendly initiation/control of modifications and/or IPL of a target system.

In one general embodiment, a computer-implemented method includes outputting an interface to a first destination, receiving a first input from a user and parsing contents of the first input. The interface includes a feature configured to accept user input. It is determined, using the parsed contents of the first input, whether the first input includes the following instances of information: a type of modification that is to be performed, a program that is to be incorporated in the performing of the modification, and a target system on which the modification is to be performed. In response to a determination that the first input does not include one or more of the instances of information, a request is output for the instance(s) of information not included in the first input. In response to a determination that the first input includes the instances of information, a process is performed. The process includes correlating the instances of information to a script file that is pre-associated with the program indicated in the instances of information, and performing the modification in accordance with the instances of information of the first input by initiating running of the script file. The process further includes collecting status information detailing the modification being performed, and outputting the status information to the first destination.

In another general embodiment, a computer program product for outputting an interface that enables streamlined user-friendly initiation/control of modifications and/or initial program loading of a target system, includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM®z/OS® environment, a UNIX® system which virtually hosts a Microsoft® Windows® environment, a Microsoft® Windows® system which emulates an IBM®z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
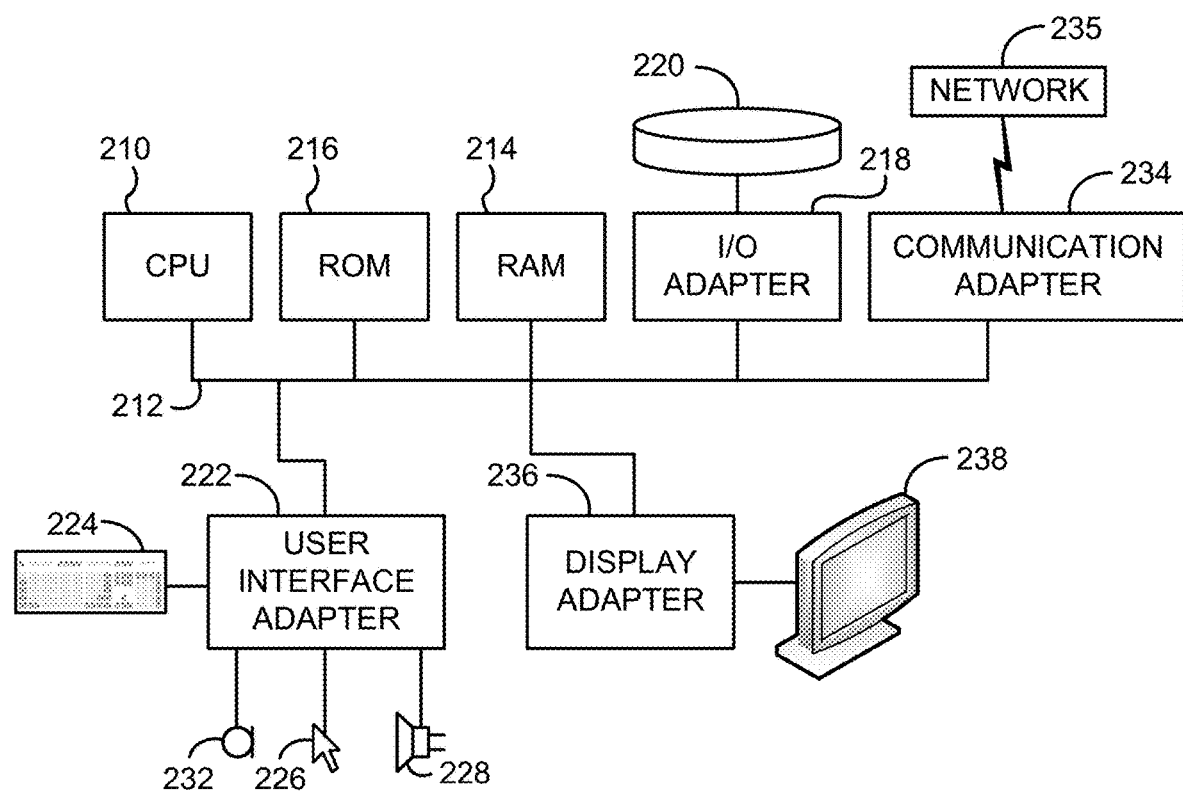
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
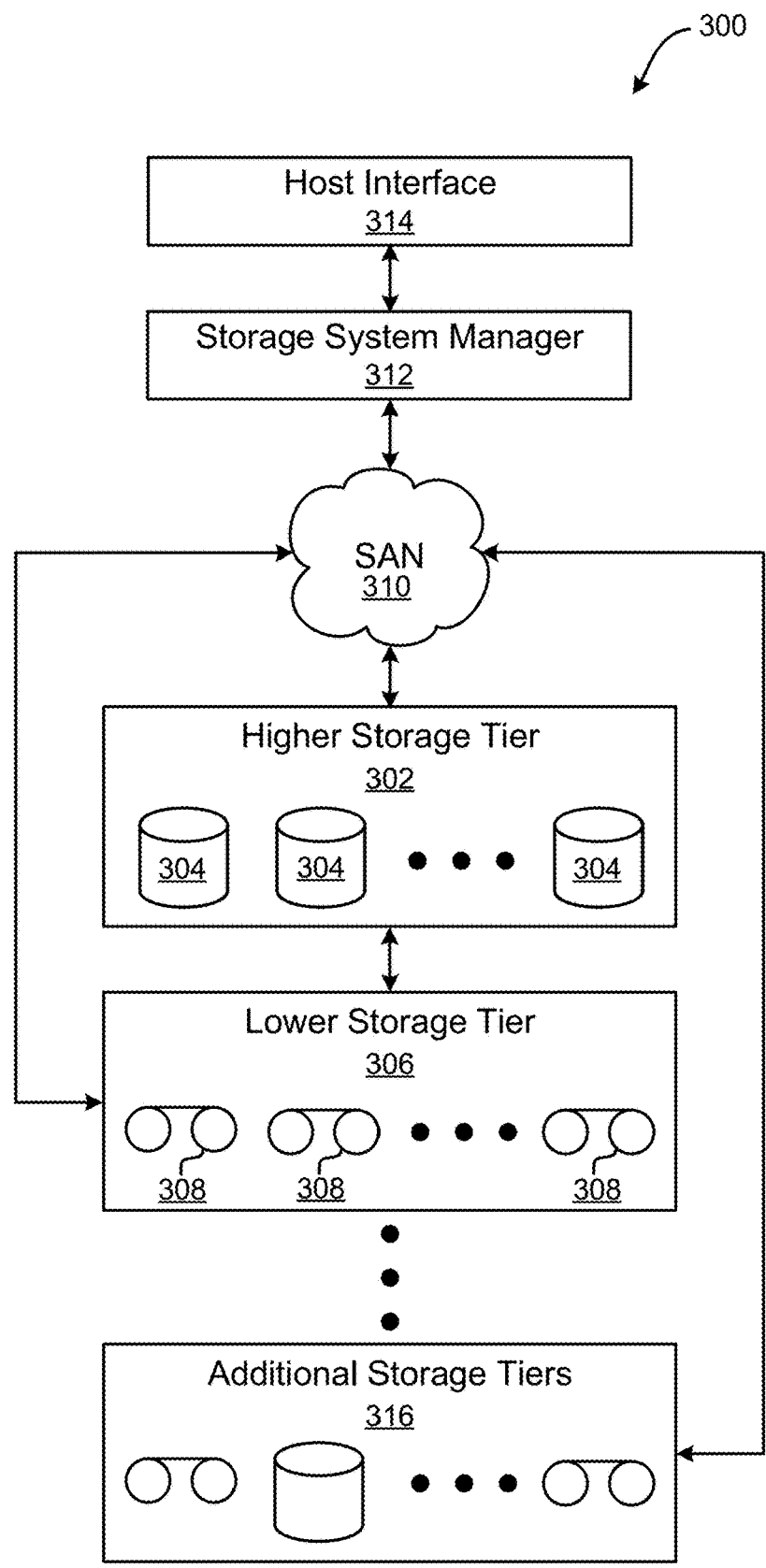
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere above, interfaces are visual outputs that may be displayed on a device. Such interfaces may differ in contents and/or appearance depending on any number of variables, e.g., use case(s), user access restrictions, device constraints, etc.

Some user interfaces are configured to, via a display displaying the user interface, allow user input thereon. In some cases, interfaces are modified depending on the contents of received user inputs. In one specific example, as a result of ongoing updating of an interface, users may perceive that they are interacting with artificial intelligence.

In some approaches, a user may enter inputs to a device displaying an interface thereon, in order to manage software products of a system. According to a more specific approach, a user may enter inputs that when processed by a program that manages software products within the system, results in an update being installed on a program within a system. For example, System Modification Program Extended (SMP/E) by IBM® (which may be purchased from IBM North America, 590 Madison Avenue, New York, N.Y. 10022, United States) is the z/OS® tool for managing the installation of software products on a z/OS® system, and for tracking modifications to those products.

Entering inputs into a graphical user interface for managing software products of a system in some approaches requires user familiarity and/or specialized knowledge. For example, a manner in which a program that manages software products within a system works and a prerequisite extent of user knowledge that may be necessary to package fixes and software products for such a program may be relatively complex, e.g., beyond general knowledge and even up to a specialized extent of knowledge/degree of training.

Initial program load (IPL) is a process of loading an operating system of a mainframe into the computer's main memory. Various embodiments and approaches herein include using a chatbot interface for streamlining user-initiated system software processes. More specifically, such embodiments and/or approaches include outputting an interface that enables streamlined user-friendly initiation/control of modifications and/or IPL of a target system. As a result, as will be described in greater detail elsewhere herein, customers lacking a familiarity and/or specialized knowledge with such systems are able to initiate such software processes without having to resort to entering relatively more complex and time-consuming command inputs on a device.

Figure 4A:
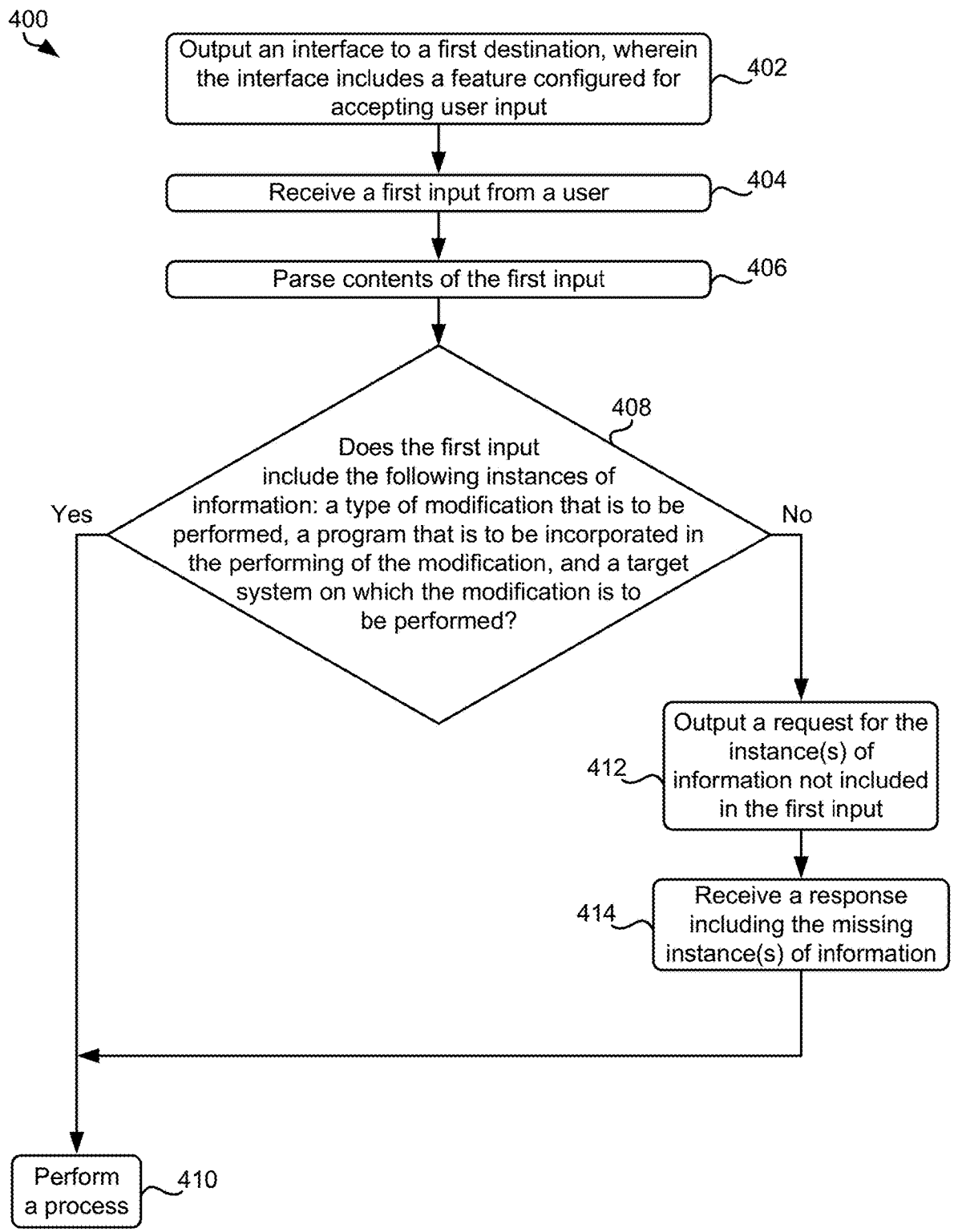
FIG. 4A is a flowchart of a method, in accordance with one embodiment.

Now referring to FIG. 4A, a flowchart of a method 400 is shown according to one embodiment. The method 400 may be performed in accordance with the present invention in any of the environments depicted in FIGS. 1-3, 5 and 6, among others, in various embodiments. Of course, more or fewer operations than those specifically described in FIG. 4A may be included in method 400, as would be understood by one skilled in the art upon reading the present descriptions.

Each of the steps of the method 400 may be performed by any suitable component of the operating environment. For example, in various embodiments, the method 400 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Operation 402 of method 400 includes outputting an interface to a first destination. According to some approaches, the first destination may be a known type of user device, e.g., such as an LCD display, at the first destination. In another approach the first destination may be a processor that determines a device that the interface should be routed to, and routes the interface thereto. According to a more specific approach, the interface may be configured to be visually output on a web browser.

The interface may include one or more feature(s) configured to accept user input. For example, in some approaches, the interface may include one or more features that are compatible with user input devices displaying the interface. According to various approaches, the feature of the interface may be, e.g., a chat window, a group of options that are selectable by a selection device of the device displaying the interface, an audio sample input portal, etc.

A first input may be received from a user, e.g., see operation 404 of method 400. The first input may be received in response to the user using the feature of the interface. For example, according to one or more approaches, the first input may be received as, e.g., a command, a request, a question, a selection, an audio sample, etc., input by the user using a feature of the interface.

Contents of the first input may be parsed, e.g., see operation 406 of method 400. The parsing may be performed using any known type of parsing, e.g., applying speech recognition to the first input where the first input is an audio sample, applying word parsing to the first input for determining content and/or context where the first input is a text sample, translating a detected language of the first input, etc.

In some approaches a determination is made as to whether the first input includes one or more predetermined instances of information, e.g., see decision 408. Such a determination may be performed using the parsed contents of the first input. For example, in one approach, such a determination may be based on the result of a comparing of at least some of the parsed contests of the first input with a list containing one or more entries of the instances of information.

The instances of information may depend on the approach. According to one non-limiting approach, the instances of information may include a type of modification that is to be performed. In such an approach, the modification may be one that the user wishes to be performed on a system, e.g., a target system. Accordingly, the instances of information may additionally and/or alternatively include a target system on which the modification is to be performed. The target system may be any type of system, e.g., a data storage system, an operating system such as the z/OS® system, a computing system, etc. In another approach, the instances of information may additionally and/or alternatively include a program that is to be incorporated in the performance of the modification, e.g., a program of the target system that is modified as a result of performing the modification.

Various examples of types of modification that may be determined to be included in the instances of information will now be described. However, it should be noted that such examples are not intended to limit descriptions herein, and thus the type of modification may be any type of modification. According to a first approach, the type of modification that is to be performed may be installing an update that is associated with an error that was previously detected on the target system. For example, in response to detecting that an error has occurred, e.g., occurred on the target system, an update may be generated that when initiated, mitigates the error, e.g., a patch/fix.

In contrast, according to another approach, the type of modification that is to be performed may be uninstalling an update that is associated with an error that was previously detected on the target system. For example, in response to a determination that an error has occurred, e.g., occurred on the target system, an update previously performed on the target system, that is determined to be/potentially be associated with the error, may be uninstalled. According to various approaches, an update may be determined to be associated with the error in response to, e.g., the error being detected on the target system within a predetermined amount of time subsequent the update being performed on the target system, the error being detected on the target system after an operation associated with the update is performed on the target system subsequent the update being performed on the target system (such as an IPL operation), a reduction of performance being detected subsequent the update being performed on the target system, etc. As a result of uninstalling the update that was previously detected on the target system, the resulting state of the target system likely will no longer experience the error, although further error correction measures may be performed in response to the error still being detected after performing an uninstalling of the update.

According to some other approaches, the type of modification that is to be performed may include changing a state of the program indicated in the instances of information. For context, a "state" of the program may refer to, e.g., an amount of processing resources that are reserved for the program, current program operating metrics, a version of the program, etc.

In one approach, the type of modification that is to be performed may include updating a state of the program indicated in the instances of information. Reasons for such an updating may include, e.g., routine maintenance, in response to a new state of the program being developed, user/administrator preference, etc. In contrast, the type of modification that is to be performed may include reverting a state of the program indicated in the instances of information. In such an approach, performing the reverting may include accessing a prior state of the program, and initiating a known type of reversion operation on the program. Of course, the state of the program prior to the reverting may additionally be stored, e.g., in memory of the system.

In response to a determination that the first input does not include one or more of the instances of information (as illustrated by the "No" logical path of decision 408), a request may be output for the instance(s) of information not included in the first input, e.g., see operation 412 of method 400. Subsequent being output, the request may preferably be added to an updated state of the interface, e.g., as an entry of a chat dialogue of the interface (see FIG. 6). During generation of the request, the request is preferably translated, e.g., formatted, in a format that about matches the format of received first input. For example, in response to the first input being received as a text input in English, the request may be formatted and output to the first destination as an English text entry on a chat dialogue of the interface. According to another example, in response to the first input being received as an audio input in German, the request may be formatted and output to the first destination as a German audio sample that is accessible for listening to as an entry on a chat dialogue of the interface.

A response may be received that includes the missing instance(s) of information, e.g., see operation 414. Accordingly, in the current embodiment, the received response may be considered a second input. In some approaches, contents of the response may be parsed to determine whether the response includes the missing instance(s) of information. In response to receiving the response that includes the missing instance(s) of information, a predetermined process may be performed, e.g., see operation 410. Note that the process of operation 410 will be described in greater detail elsewhere herein, e.g., see FIG. 4B.

In contrast, in response to a determination that the first input includes the instances of information (as illustrated by the "Yes" logical path of decision 408) the predetermined process may be performed, e.g., see operation 410 of method 400. The process may be performed any number of times, e.g., a single time, in iterations where it is determined from the instances of information of the first input that multiple modifications are to be performed, as a batch job where it is determined from the instances of information of the first input that multiple modifications are to be performed, etc. According to some approaches, the process preferably includes performing the modification according to the instances of information of the first input, e.g., see FIG. 4B.

Figure 4B:
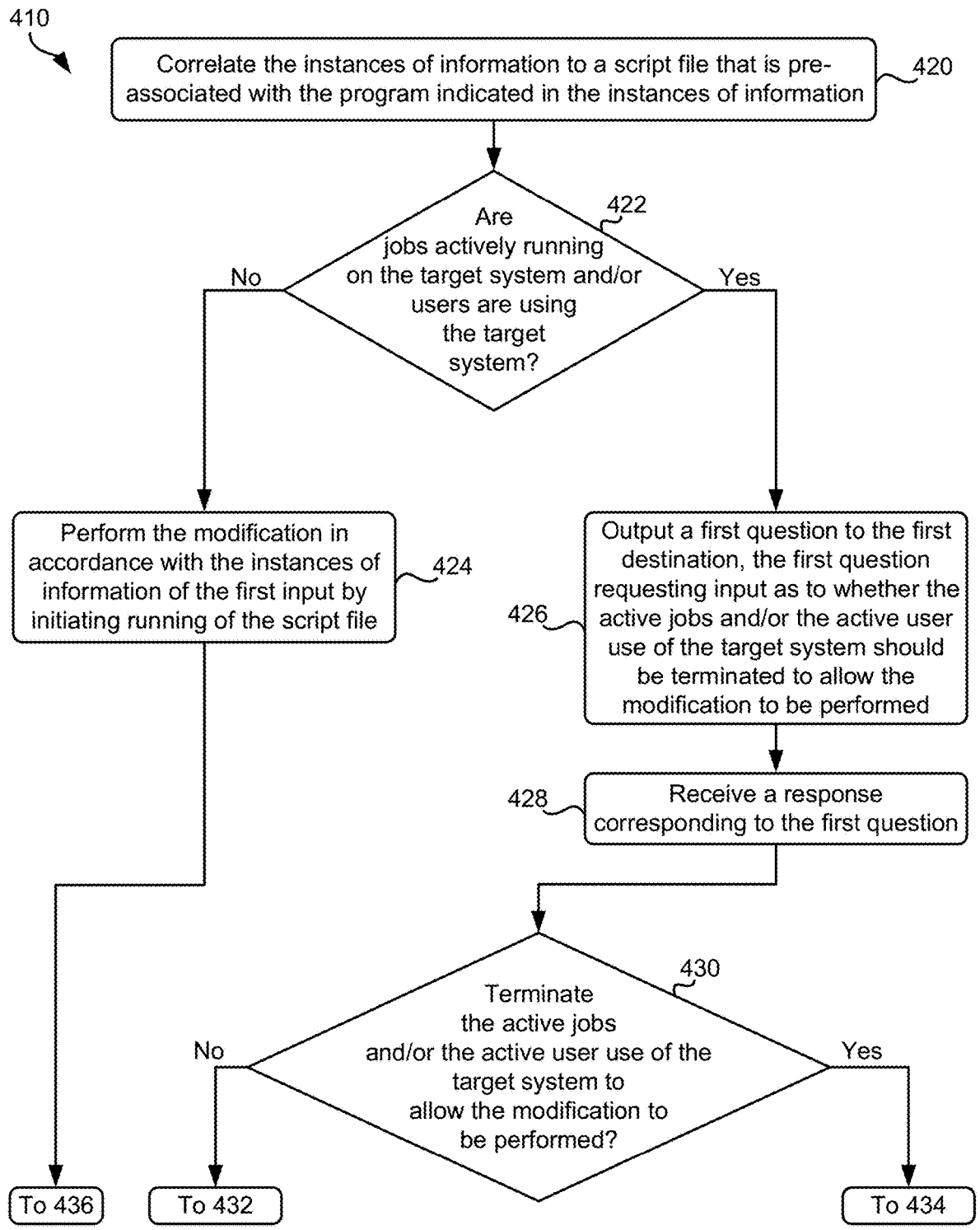
FIG. 4B is a flowchart having sub-operations of an operation of the method of FIG. 4A.
Figure 4B:
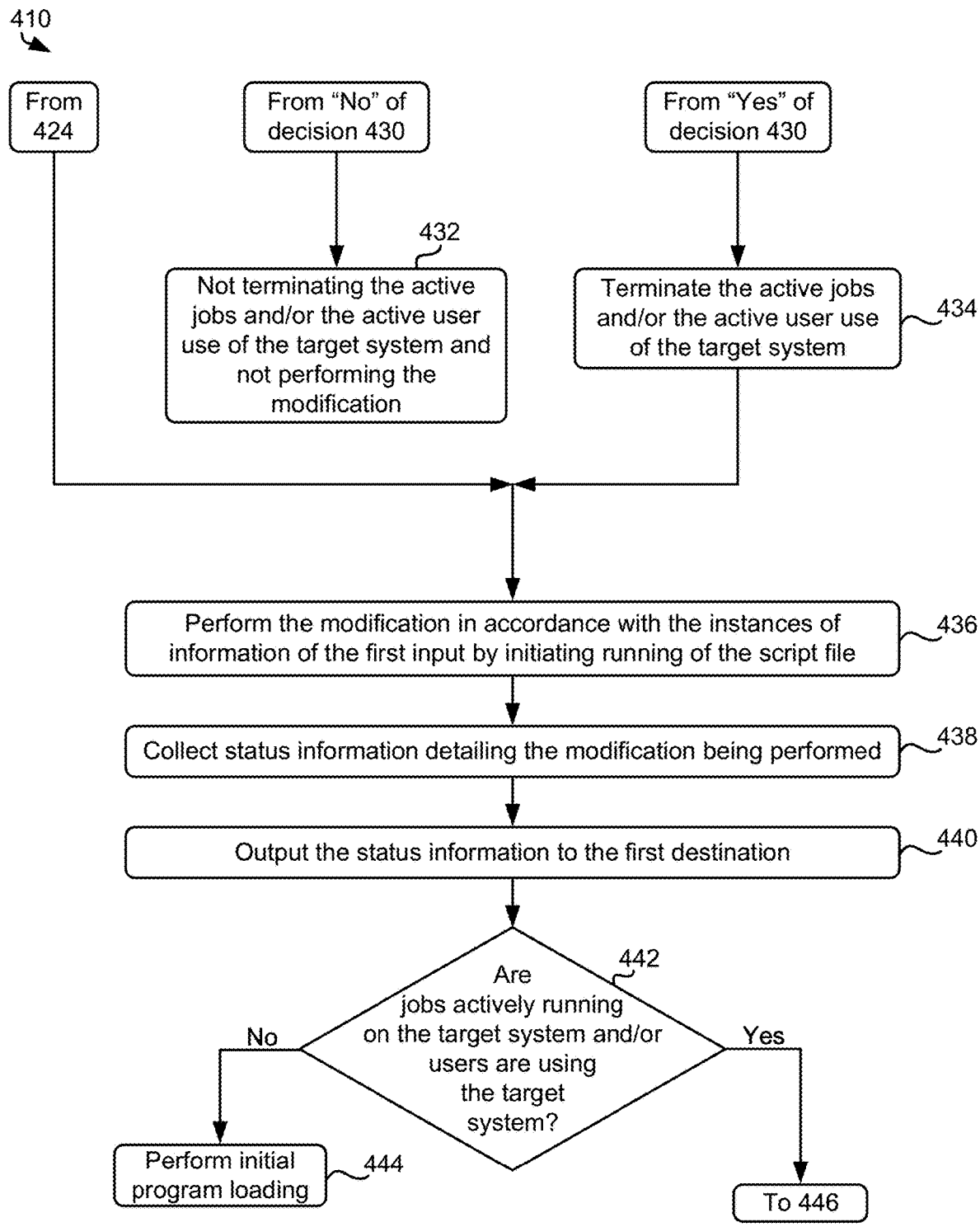
Figure 4B:
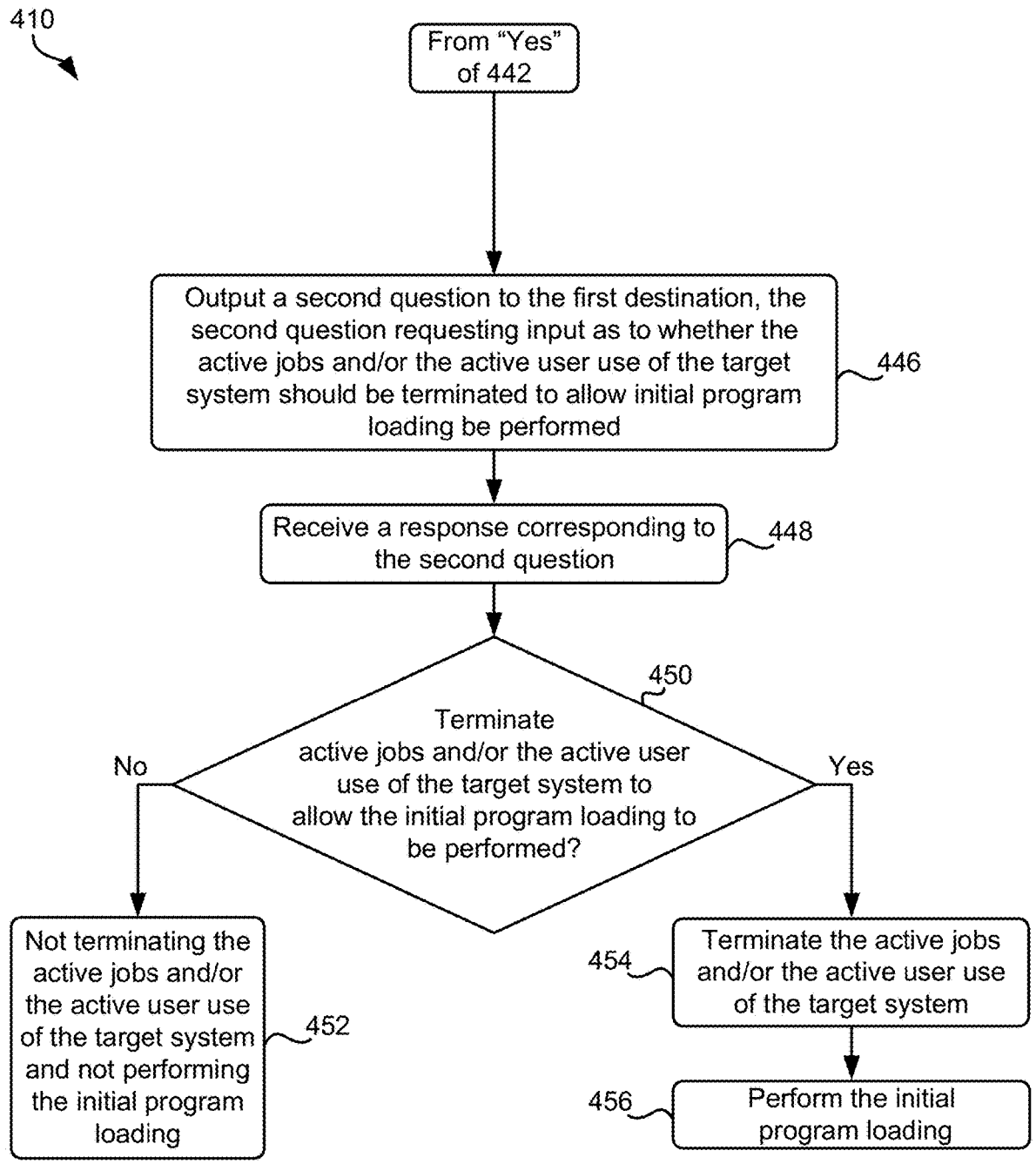

Looking to FIG. 4B, exemplary sub-processes 420-456 of the process are illustrated in accordance with one embodiment, one or more of which may be used to perform operation 410 of FIG. 4A. However, it should be noted that the sub-processes of FIG. 4B are illustrated in accordance with one embodiment which is in no way intended to limit the descriptions herein.

In some approaches, the process may include correlating the instances of information to one or more script file(s) that are pre-associated with the program indicated in the instances of information, e.g., see sub-operation 420. Such correlating may in some approaches include first correlating the instances of information to a predetermined/pre-associated action, e.g., run file, access file, etc., where a subsequent performance of the action results in the initiating of predetermined script files.

With continued reference to FIG. 4B, in some approaches, prior to performing the modification in accordance with the instances of information of the first input by initiating running of the script file, it may be determined whether there are any active processes running within the target system. For example, according to a more specific approach, it may be determined prior to performing the modification, whether jobs are actively running on the target system and/or users are using the target system, e.g., see sub-operation 422. Such a consideration may be made in order to prevent a job from going unfulfilled/freezing, and/or in order to prevent a user actively using the target system from losing access to the target system without warning.

In response to a determination that jobs are not actively running on the target system and/or users are not using the target system (as illustrated by the "No" logical path of sub-operation 422), the modification may be performed in accordance with the instances of information of the first input, e.g., see sub-operation 424. In other words, in some approaches, as a result of initiating running of the script file, a modification may be performed on the target system in the type and while incorporating the program, as specified in the instances of information of the first input. However, recall that in some approaches, the instances of information may be specified in more than one input, and therefore in such approaches the modification may be performed on the target system in the type and while incorporating the program as specified in the instances of information of several received inputs.

On the contrary, in response to a determination that jobs are actively running on the target system and/or users are using the target system (as illustrated by the "Yes" logical path of sub-operation 422), a first question may be generated and output to the first destination. In some approaches the first question requests input, e.g., from the user, as to whether the active jobs and/or the active user use of the target system should be terminated to allow the modification to be performed, e.g., see sub-operation 426.

Sub-operation 428 includes receiving a response corresponding to the first question, e.g., a first response. However, in some approaches, if a response is not received within a predetermined amount of time, the first question may be output again, e.g., re-output to the first destination, output to a second destination, etc. In another approach, in response to a response not being received within a predetermined amount of time, an answer to the first question may be determined, e.g., it may be assumed that the actively running jobs/user use should be terminated, or alternatively it may be assumed that it may be assumed that the actively running jobs/user use should not be terminated.

Subsequent to receiving the response corresponding to the first question, in some approaches it may be determined from the response whether the active jobs and/or the active user use of the target system should be terminated to allow the modification to be performed, e.g., see sub-operation 430. In response to a determination that the response corresponding to the first question indicates that the active jobs and/or the active user use of the target system should not be terminated to allow the modification to be performed (as illustrated by the "No" logical path of sub-operation 430), in some approaches the active jobs and/or the active user use of the target system may not be terminated, e.g. see sub-operation 432. Moreover, in some approaches, the modification may not be performed, at least until the active jobs and/or the active user use of the target system is completed. For example, in some approaches the modification may be scheduled to be performed upon a determination being made that the active jobs and/or the active user use of the target system are no longer active, e.g., are determined to have fallen below a predetermined threshold of activity.

In response to the response corresponding to the first question indicating that the active jobs and/or the active user use of the target system should be terminated to allow the modification to be performed (as illustrated by the "Yes" logical path of sub-operation 430), the active jobs and/or the active user use of the target system may be terminated, e.g., see sub-operation 434. The active jobs and/or the active user use of the target system may be terminated by performing any one or more operations that make the target system available for performing the modification thereon, e.g., terminating a previously granted user access credential to the interface, suspending the user interface, locking the feature of the interface, etc. In some approaches, a warning may be output to the first destination that indicates that such active jobs/user use is going to be terminated. Such a warning may be output to the first destination as an updated state of the interface.

Although in the approach above, the determination whether jobs are actively running on the target system and/or users are using the target system is made prior to performing the modification, in some approaches a similar determination may be additionally and/or alternatively performed after performing the modification. For example, as will be described elsewhere herein, a similar determination may be additionally and/or alternatively performed prior to performing an IPL process, e.g., see sub-operations 442-456.

Sub-operation 436 includes performing the modification in accordance with the instances of information of the first input. Note that the modification may be additionally and/or alternatively performed in accordance with one or more other received inputs. In the current approach performing the modification may include initiating running of the script file.

With continued reference to FIG. 4B, at any time during performing the modification, the process of method 400 may include collecting status information detailing the modification being performed, e.g., see operation 438. According to several illustrative approaches, types of such status information may include, e.g., a date and time at which the program that is to be incorporated in performance of the modification was previously received, maintenance operations that are scheduled to be performed before a next action is performed in accordance with performing the modification, macros that have been updated on the target system since initiating the script file, a time of completion of performing the modification, and identities of load modules that were amended (updated/reverted) during performance of the modification, etc.

The status information may be useful for the user, such as to, e.g., update the user of the status of the modification process, allow the user to monitor performance of the target system while the modification is being performed, inform the user of one or more aspects of the target system that are impacted as a result of the modification being performed, etc. Accordingly, in some approaches, the process may include outputting the status information to the first destination, e.g., see sub-operation 440. Outputting of the status information to the first destination may include outputting an updated state of the interface.

In some approaches, the status information may be translated to a predetermined format that the first user or any other user that has access to the device displaying the interface may be familiar with. For example, prior to outputting the status information, the status information may be translated to chat window dialogue that corresponds to the contents of the status information. Specifications of the chat window dialogue may be set by, e.g., an administrator of the target system, input received from the user, in accordance with/matching any specifications of the received first input and/or any other received input, etc.

Subsequent to performing the modification, in some approaches, a refresh may be performed on the target system, e.g., an automatic refresh.

In some approaches, the process of method 400 may additionally and/or alternatively apply to IPL processes. For example, in one approach, it may be determined prior to performing an IPL of the program indicated in the instances of information, whether jobs are actively running on the target system and/or users are using the target system, e.g., see sub-operation 442. In one approach, such a determination may be performed in order to prevent users and/or programs from unexpectedly losing progress as a result of the IPL being performed in the program.

According to one approach, in response to a determination that jobs are not actively running on the target system and/or users are not using the target system (as illustrated by the "No" logical path of sub-operation 442), the IPL may be performed, e.g., see sub-operation 444.

In contrast, in response to a determination that jobs are actively running on the target system and/or users are using the target system (as illustrated by the "Yes" logical path of sub-operation 442), according to one approach, a second question may be output to the first destination, e.g., see sub-operation 446. In the current approach, the second question requests input as to whether the active jobs and/or the active user use of the target system should be terminated to allow the IPL to be performed. For contextual purposes, it may be noted that "second" of the second question may assume that the first question of sub-operation 426 is previously output to the first destination. However, this assumption is not intended to limit the descriptions herein. For example, according to various approaches, the process of operation 410 may include, e.g., only outputting the question of sub-operation 426 or only outputting the question of sub-operation 446, outputting the question of sub-operation 426 and outputting the question of sub-operation 446, or outputting neither of the questions of sub-operation 426 and sub-operation 446.

Sub-operation 448 includes receiving a response corresponding to the second question. Subsequent receiving the response corresponding to the second question, in some approaches it may be determined from the response corresponding to the second question whether the active jobs and/or the active user use of the target system should be terminated to allow the IPL to be performed, e.g., see sub-operation 450. In response to a determination that the response corresponding to the second question indicates that the active jobs and/or the active user use of the target system should not be terminated to allow the IPL to be performed (as illustrated by the "No" logical path of sub-operation 450), in some approaches, the active jobs and/or the active user use of the target system may not be terminated, e.g. see sub-operation 452. Moreover, in some approaches, the IPL may not be performed, at least until the active jobs and/or the active user use of the target system is completed, e.g. see sub-operation 452. For example, in some approaches the IPL may be scheduled to be performed upon a determination being made that the active jobs and/or the active user use of the target system are no longer active, e.g., are determined to have fallen below a predetermined threshold of activity.

In response to the response corresponding to the second question indicating that the active jobs and/or the active user use of the target system should be terminated to allow the IPL to be performed (as illustrated by the "Yes" logical path of sub-operation 450), the active jobs and/or the active user use of the target system may be terminated, e.g., see sub-operation 454. The active jobs and/or the active user use of the target system may be terminated by performing any one or more operations that make the target system available for performing the IPL thereon, e.g., terminating previously granted user access credential to the interface, suspending the user interface, locking the feature of the interface, etc. In some approaches, a warning may be output to the first destination that indicates that such active jobs/user use is going to be terminated.

In the current approach, subsequent terminating the active jobs and/or the active user use of the target system, the IPL may be performed, e.g., see sub-operation 456.

It should be noted that there are several benefits that result from utilizing method 400 in system management processes. For example, method 400 enables an outputting of an interface that enables streamlined user-friendly initiation/control of modifications and/or initial program loading (IPL) of a target system. This is because as described elsewhere herein, modifications/IPL of target systems conventionally often require users to have a developed familiarity with and/or a specialized knowledge of program(s) used to initiate and perform such operations. However, where a user does not have a developed familiarity and/or specialized knowledge with such program(s), inexperienced users are conventionally sometimes unable to initiate modifications/IPL on target systems or are forced to resort to other attempts to initiate/control such operations, e.g., trial by error attempts, recruiting a user that is familiar with/has a specialized knowledge of the target system program that is to be modified/have IPL performed thereon, expending time to acquire a familiarity/specialized knowledge of the target system program that is to be modified/have IPL performed thereon, etc.

These attempts may otherwise consume user time and system resources, and therefore decrease performance of the target system as a result of any such attempts being unsuccessful. In sharp contrast, utilizing one or more embodiments and/or approaches described herein, e.g., such as method 400, for managing a target system, may result in a preservation of resources and performance of a target system because users do not have to have a familiarity with/a specialized knowledge of how to specify/initiate target system program modifications/IPL. For example, assuming that it is determined, e.g., determined by performing decision 408, that the first input received from a user of operation 404 of method 400 does not include even a single instance of information, requests may be output for such information, thereby guiding the user in initiating/controlling the intended modification/IPL.

The relative simplicity of initiating/controlling modifications and/or IPL using one or more embodiments and/or approaches described herein is readily apparent when considering the extent of familiarity and/or specialized knowledge that users otherwise must have using conventional techniques for initiating/controlling modifications and/or IPL on a target system. For purposes of an example, which is in no way intended to limit the descriptions herein, such an extent of familiarity and/or specialized knowledge of operations that a user may have to have for initiating/controlling a modification and/or IPL operation without the use of embodiments and/or approaches described herein is detailed in the list below.

List 1

1.) Open personal communication (PCOMM) and log in a predetermined machine
2.) Traverse to a dataset list utility panel
3.) Type correct name of a data set on a predetermined volume to access a given dataset
4.) Create job control language (JCL) to install a new authorized program analysis report (APAR) with correct information of APAR name and current IPL volume
5.) Return to PCOMM and log in the native system that the APAR is to be installed on
6.) Return to the data set list utility panel
7.) Correctly enter name of the data set on the volume to go into the data set
8.) Search for the name of the newly created JCL file that installs the APAR
9.) Submit the job
10.) Go to system display search facility (SDSF) Held output queue
11.) Read the output of the installing job to check if the job has run fine and which load module system library has been updated
12.) Go to system log panel
13.) Check which jobs are being run
14.) Check which users are using the system
15.) Check IPL volume number
16.) Set up diagnose value to be the right IPL volume
17.) Check which native systems are in the same syplex
18.) Log off the system
19.) Return to PCOMM and log in a native system that is in the same syplex
20.) Check remotely if the target native system has been fully shutdown
21.) Correctly issue an IPL command
22.) Answer the system with the message number and the name of the target system
23.) Check the job log repeatedly to see if the target system has been done with IPLing In summary, while conventional techniques for initiating/controlling modification of a target system, e.g., SMP/E operations, may require that a user have a familiarity and/or specialized knowledge of software, some embodiments and approaches described herein simplify such processes for most, if not all users. For example, as will be described in further detail elsewhere herein, query processes are simplified through the use of script file(s) that may be pre-associated with a program indicated in the instances of information of a user input, e.g., see Java and Rexx scripts of FIG. 5. Accordingly, there is no need for users to know/become familiar with specific APAR/release naming conventions, which are conventionally used, e.g., see Table 1. Moreover, users need not themselves track the progress of a modification process/optional operations that may be next performed subsequent such modification being performed, as they may be provided with such information, e.g., see status information of sub-operations 438-440.

A similar summary of benefits also extends into the context of IPLs operations described herein. This is because conventionally, IPL operations are often initiated by user input of users that have specialized knowledge in such management processes, e.g., human interaction with hardware management console (HMC) graphical user interfaces, program interaction with specialized program management interfaces, third party system automation software, etc. However, using one or more embodiments and/or approaches described herein, such interaction with the HMC may be bypassed using existing z/OS features to reduce the time and complexity of IPL process management. Some embodiments and/or approaches described herein enable additional bypassing, including the altering of load addresses (IPL volumes) using existing z/OS features without accessing HMCs. It may be noted that the driving/invoking of these z/OS features may be performed in various embodiments and/or approaches described herein through a chatbot interface, e.g., for example one that is integrated through IBM Watson Assistant, making it possible to IPL a z/OS system through a web interface without the traditional HMC access.

Figure 5:
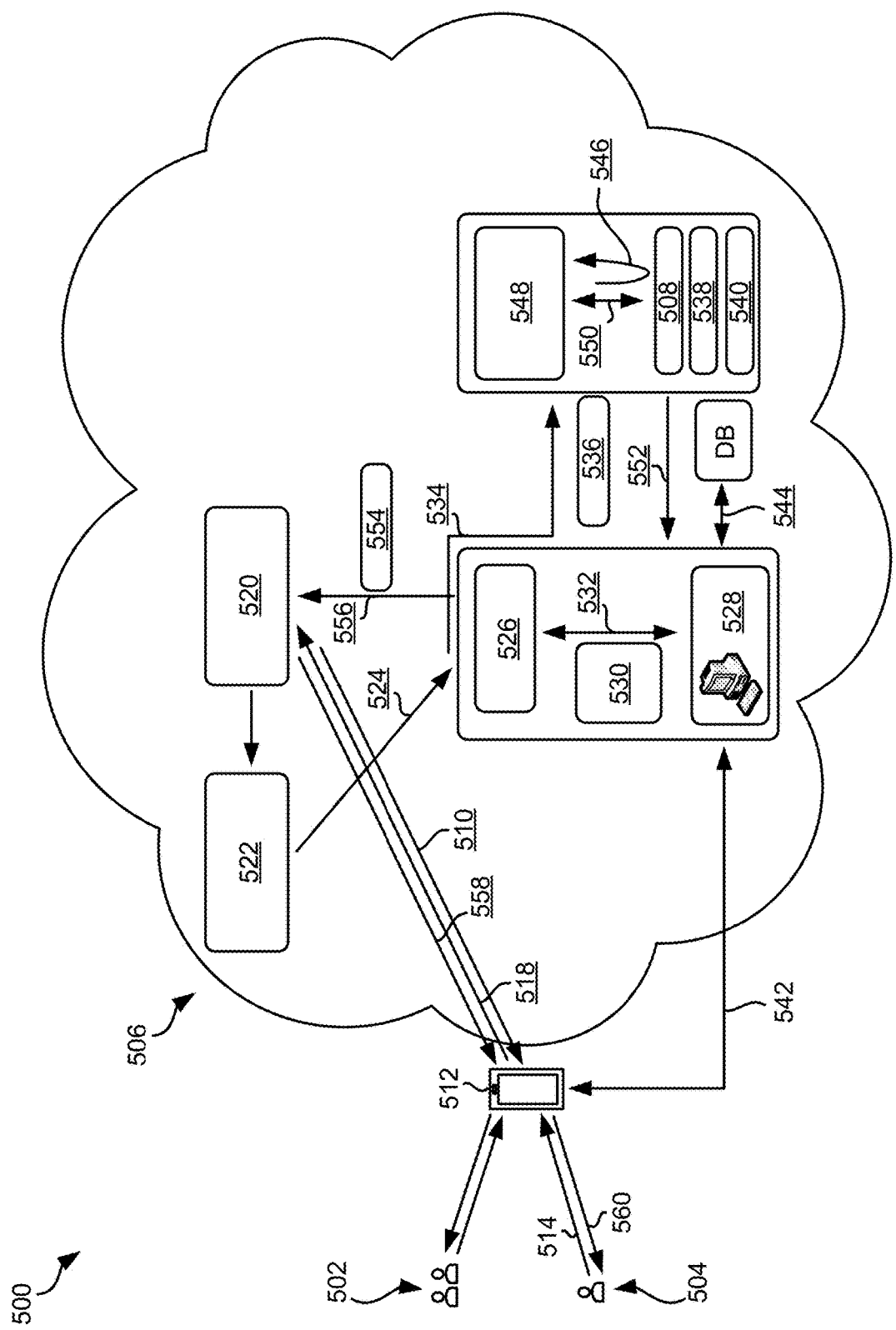
FIG. 5 a representational environment, in accordance with one embodiment.

FIG. 5 depicts a representational environment 500, in accordance with one embodiment. As an option, the present environment 500 may be implemented in conjunction with features from any other embodiment listed herein, such as those described with reference to the other FIGS. Of course, however, such environment 500 and others presented herein may be used in various applications and/or in permutations which may or may not be specifically described in the illustrative embodiments listed herein. Further, the environment 500 presented herein may be used in any desired environment.

In the present approach, environment 500 includes a first set of users 502 and another user 504. Environment 500 further includes a system 506, which in the present embodiment is a cloud-based system, although in other embodiments may be any type of system. Various operations will now be described in which a target system 508 of the system 506 is modified according to instances of information of input(s) received from the user 504.

In operation 510, an interface is output to a first destination, e.g., to a conversation interface 512. The conversation interface may be a known type of user device configured to display an interface. In the current approach, the interface is configured to be visually output on a web browser. Accordingly, in the present approach, the interface is accessed by users 502, 504 via a web browser addresses, e.g., the first set of users 502 may access the interface via the web browser address: http://ipaddress:port1, and the users 504 may access the interface via the web browser address: http://ipaddress:port2.

The interface may include one or more feature(s) configured to accept user input. For example, the interface may include a chat window feature in which the user 504 inputs a first input, e.g., see operation 514. The contents of the first input may be received by the system 506 and parsed using any known technique(s). According to one specific approach, in order to parse the first input, the contents of the first input may be delivered, e.g., see operation 518, as a user query/command to an artificial intelligence/machine learning program of the system 506, e.g., such as a program/service of Watson Assistant 520 by IBM® (which may be purchased from IBM North America, 590 Madison Avenue, New York, N.Y. 10022, United States), which may be configured to parse contents of a received input. In such parsing, in one approach the first input may be divided into parameters, e.g., intent, entities, dialogue, etc., based on the content of the first input, which may be used to build a dialogue node. In some approaches, a type of cloud function service(s) 522 known in the art may be additionally and/or alternatively utilized for performing such parsing into JavaScript Object Notation (JSON) style parameters.

It may be determined, using the parsed contents of the first input, whether the first input includes predetermined instances of information, e.g., a type of modification that is to be performed, a program that is to be incorporated in the performance of the modification, a target system on which the modification is to be performed, etc. In one approach, in response to a determination that the first input does not include one or more of the instances of information, a request may be output, e.g., to the first destination, for the instance(s) of information not included in the first input. In an alternate approach, in response to a determination that the first input includes the instances of information, a process may be performed. Operations that are to be performed during the performance of the process may be determined based on the instances of information. In the present approach, such operations of the process may be delivered as an action to an application 526 by the cloud function service(s) 522 for further processing, e.g., see operation 524.

For context, in one specific approach, the application 526 may be a Watson Assistant SMP/E Application by IBM® (which may be purchased from IBM North America, 590 Madison Avenue, New York, N.Y. 10022, United States). The application 526 may be in communication with a server 528, e.g., such as a VM5 server. According to one approach, such communication may be enabled using a two-way I/O interaction 532, which may utilize JavaScript and/or the IBM® SDK for Node.js 530 which may provide a JavaScript runtime and server-side JavaScript solution for IBM® operating systems (which may be purchased from IBM North America, 590 Madison Avenue, New York, N.Y. 10022, United States). The server 528 may additionally and/or alternatively be in communication with a known type of database, e.g., see two-way I/O interaction 544 between the server 528 and database DB. Moreover, the server 528 may additionally and/or alternatively be in communication with the conversation interface 512 via a two-way I/O interaction 542. The two-way I/O interaction 542 may serve as a relay for interface specifications, e.g., html specification information, cascading style sheets (CSS) specification information, etc., between the server 528 and the conversation interface 512.

In the current approach, the instances of information may be correlated, e.g., by application 526, to a script file, e.g., such as a JavaScript file, that is pre-associated with the program indicated in the instances of information. The script file may use a Node.js node package manager (NPM) package using a zos-node-accessor 536 to connect to one or more systems, such as the target system 508 and other systems 538, 540, e.g., see operation 534. Depending on the approach, one or more of the systems 508, 538, 540 may be z/OS® systems that use z/OS® operating systems.

The modification may be performed in accordance with the instances of information of the first input by initiating running of the script file, e.g., see operation 546. In some preferred approaches, the modification may be performed by one of the systems 508, 538, 540 running the script file. Running of the script file may in some approaches include using one or more z/OS® tools, e.g., z/OS® batch jobs, Rexx libraries, automated z/OS® processes, querying the target system, monitoring processes of cumulative program temporary fix (PTF) packages, etc., which may be automated by processing predefined formatted collections of languages, e.g., Rexx, JCL, etc., which may be stored in a database 548 that is in communication with one or more of the systems 508, 538, 540, e.g., see two-way I/O interaction 550.

In some approaches the modification may be at least in part controlled by SMP/E, which may control such changes at a component level of the target system 508. For example, according to various approaches, the controlling may include, e.g., collecting status information detailing the modification being performed, selecting predetermined amounts/extents of code to be installed from a greater a library of potential code, calling system utility programs to install updates, generating and/or storing records detailing the modifications performed by providing an input feature that allows the user to inquire status of the modification, reversing a most previously performed modification, etc. However, as would be appreciated by one of ordinary skill in the art upon reading descriptions herein, users need not have familiarity and/or specialized knowledge with the intricacies of SMP/E in order to perform modification operations such as the controlling described above.

The collected status information may be output to the first destination. For example, according to the present approach, the status information may be sent from the target system 508 to the application 526, e.g., see operation 552. There the collected information may be formatted for the Watson Assistant 520, e.g., in JavaScript. From the application 526, the status information may be sent to the Watson Assistant 520, e.g., see the collected information being output from the application 526 to the Watson Assistant 520 as a Watson-developer-cloud JavaScript package 554, e.g., see operation 556. Moreover, in the current approach, outputting the status information to the first destination includes sending the status information, e.g., by Watson Assistant 520, to the conversation interface 512, e.g., see operation 558, where the status information may be viewed by the user 504, e.g., see status information received by the user 504 in operation 560.

Figure 6:
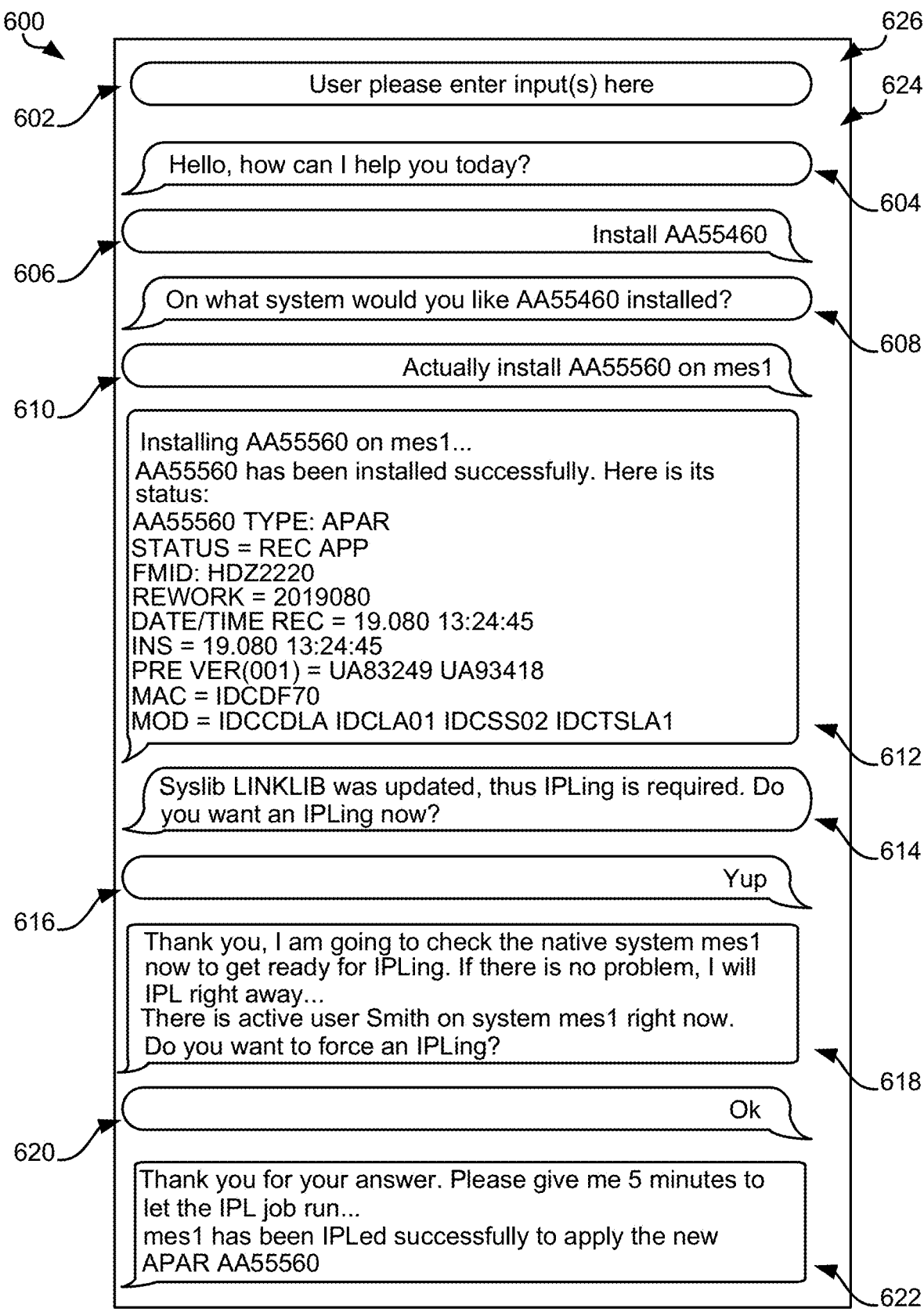
FIG. 6 a display device, in accordance with one embodiment.

FIG. 6 depicts a display device 600, in accordance with one embodiment. As an option, the present display device 600 may be implemented in conjunction with features from any other embodiment listed herein, such as those described with reference to the other FIGS. Of course, however, such display device 600 and others presented herein may be used in various applications and/or in permutations which may or may not be specifically described in the illustrative embodiments listed herein. Further, the display device 600 presented herein may be used in any desired environment.

The display device 600 includes a display 624, which may be any known type of user display device. Moreover, circuitry and logic of a type known in the art for driving the display 624 may be included in the display device 600.

In the current approach, the display device 600 serves as a first destination to which an interface 626 may be output to. The interface 626 may include a feature 602 for accepting user input. Specifically, in the present approach, the feature 602 of the interface 626 is a text entry bar to which user inputs may be entered using a known type of entry, e.g., voice samples, tapping the area of the display 624 displaying the feature 602 and thereafter typing an entry into a keyboard that is synced with the feature 602, dragging and dropping, selecting options that are presented in the feature 602, etc.

As illustrated in FIG. 6, the interface 626 may be arranged as chat window, in which comments received from a user and comments output on the display device 600 that are chronologically ordered. For example, a first comment 604 includes a request that asks for user input. The interface may enable considerable faster target system management than existing system management interfaces. For example, a relative increase in proficiency may result from the display device being configured to be driven by operator commands as opposed to other GUI interface that may be configured to interact with a hardware management console. However, in some approaches, the display device 600 may be configured to use at least some existing security constructs to ensure the IPL process can be strictly controlled.

A first input, e.g., "Install AA55460" may be received from a user, e.g., see comment 606. The first input of comment 606 may be parsed using any one or more known techniques for parsing comments of an input. Using the parsed contents of the first input, it may be determined whether the first input includes predetermined instances of information. For purposes of an example which is in no way intended to limit the descriptions herein, it may be assumed that in the current approach, the predetermined instances of information include: a type of modification that is to be performed, a program that is to be incorporated in the performance of the modification, and a target system on which the modification is to be performed.

It may be determined, e.g., using the parsed contents of the first input, whether the first input includes the predetermined instances of information. In the current approach, it may be determined that the first input of comment 606 includes the instances of information including, a type of modification that is to be performed, i.e., Install, and a program that is to be incorporated in the performance of the modification, i.e., AA55460. However, it may be noted that the first input of comment 606 does not include an instance of information that specifies a target system on which the modification is to be performed. Accordingly, in one approach, in response to a determination that the first input does not include one or more of the instances of information, e.g., in the present approach a target system on which the modification is to be performed, a request may be output for the instance(s) of information not included in the first input. For example, in the current approach, the request is output to the display device 600, and added as a comment 608 on the interface 626. More specifically, in the current approach, the request of comment 608 includes a request for the user to specify on which system the AA55460 program should be installed.

A second input, e.g., answering the request of comment 608, may be received from the user as a result of the user entering input using the feature 602. In the current approach, the contents of the second input are included in a comment that is added to the interface 626, e.g., see comment 610. The contents of the second input may be parsed for determining whether the second input includes the instances of information not included in the first input. It may be determined using the parsed contents of the second input that the second input includes the instance of information not included in the first input, e.g., content specifying that the installation is to be performed on target system mes1.

In some approaches, it may be additionally and/or alternatively determined whether the second input includes any instances of information that replace/update the instances of information of the first input. For example, in the current approach, it may be determined whether the second input includes instances of information that are intended to replace instances of information of the first input. More specifically, as illustrated in comment 610, according to one approach, the content of the second input may include input "Actually install the AA55560 on mes1." In such an example, it may be determined using the parsed contents of the second input that the AA55560 program is to be installed on system mes1. Moreover, a context may be determined from the portion "Actually" of the second input, which specifies that the user intends for the program AA55560 to be installed on the program mes1 instead of the previously mentioned program AA55460.

In response to a determination that the first input and/or subsequent input(s) include the instances of information, a process may be performed. As described elsewhere herein, in some approaches the process includes correlating the instances of information to a script file that is pre-associated with the program indicated in the instances of information. Moreover, in some approaches, the process may include performing the modification in accordance with the instances of information of the first input by initiating running of the script file, e.g., see Installing AA55560 on mes1 of comment 612.

In the current approach, status information is collected detailing the modification being performed. The collected status information may be translated to chat window dialogue that corresponds to the contents of the status information. For example, the comment 612 includes status information that is displayed as chat window dialogue. Specifically, in sequential order, the status information of comment 612 includes: specifications of the program type, e.g., see A55560 TYPE; a status indicating whether the program that is to be incorporated in performance of the modification has been received or not, e.g., see STATUS; a function applied during performing the modification, e.g., see FDIM; a date at which a the modification is scheduled to be performed, e.g., see REWORK; a date and time at which the program that is to be incorporated in performance of the modification was previously received, e.g., see DATE/TIME REC; a date and time of completion of performing the modification, e.g., see INS; maintenance operations that are scheduled to be performed before a next action is performed in accordance with performing the modification, e.g., see PRE VER(001); macros that have been updated on the target system since initiating the script file, e.g., see MAC; and identities of load modules that were amended during performance of the modification, e.g., see MOD.

In some approaches, it may be determined whether jobs are actively running on the target system and/or users are using the target system prior to one or more operations being performed. For example, in response to the user selecting that they would like IPLing performed now, e.g., see comments 614-616, in the current approach, it is determined prior to performing the IPL, whether jobs are actively running on the target system and/or users are using the target system, e.g., see comment 618. In response to a determination that jobs are not actively running on the target system and/or users are not using the target system, IPL may be performed. However, in contrast, in response to a determination that jobs are actively running on the target system and/or users are using the target system, e.g., see comment 618 indicating a finding that Smith is actively using mes1, a question may be output to the first destination that requests input as to whether the active jobs and/or the active user use of the target system should be terminated to allow the IPL to be performed, e.g., see "Do you want to force an IPLing?"

In response to receiving a response, e.g., from the user, indicating that the active jobs and/or the active user use of the target system should be terminated to allow the IPL to be performed, e.g., see "Ok" of comment 620, the active jobs and/or the active user use of the target system may be terminated and the IPL may be performed, e.g., see comment 622.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   outputting an interface to a first destination, wherein the interface includes a feature configured to accept user input;
   receiving a first input from a user;
   parsing contents of the first input;
   determining, using the parsed contents of the first input, whether the first input includes the following instances of information: a type of modification that is to be performed, a program that is to be incorporated in the performing of the modification, and a target system on which the modification is to be performed;
   in response to a determination that the first input does not include one or more of the instances of information, outputting a request for the instance(s) of information not included in the first input; and
   in response to a determination that the first input includes the instances of information, performing a process, the process including:
      correlating the instances of information to a script file that is pre-associated with the program indicated in the instances of information;
      performing the modification in accordance with the instances of information of the first input by initiating running of the script file;
      collecting status information detailing the modification being performed; and
      outputting the status information to the first destination.

2. The computer-implemented method of claim 1, wherein the interface is configured to be visually output on a web browser, wherein the feature of the interface is a chat window, and comprising: prior to outputting the status information, translating the status information to chat window dialogue that corresponds to the contents of the status information.

3. The computer-implemented method of claim 1, wherein the type of modification that is to be performed is a modification selected from the group consisting of: installing an update that is associated with an error that was previously detected on the target system, and uninstalling an update that is associated with an error that was previously detected on the target system.

4. The computer-implemented method of claim 1, wherein the type of modification that is to be performed is a modification selected from the group consisting of: updating a state of the program indicated in the instances of information, and reverting a state of the program indicated in the instances of information.

5. The computer-implemented method of claim 1, wherein the collected status information includes one or more types of information selected from the group consisting of: a date and time at which the program that is to be incorporated in performance of the modification was previously received, maintenance operations that are scheduled to be performed before a next action is performed in accordance with performing the modification, macros that have been updated on the target system since initiating the script file, a time of completion of performing the modification, and identities of load modules that were amended during performance of the modification.

6. The computer-implemented method of claim 1, comprising:
   determining, prior to performing the modification, whether jobs are actively running on the target system and/or users are using the target system;
   in response to a determination that jobs are actively running on the target system and/or users are using the target system, outputting a first question to the first destination, wherein the first question requests input as to whether the active jobs and/or the active user use of the target system should be terminated to allow the modification to be performed;
   in response to a determination that jobs are not actively running on the target system and/or users are not using the target system, performing the modification;
   determining, prior to performing an initial program load (IPL) of the program indicated in the instances of information, whether jobs are actively running on the target system and/or users are using the target system;
   in response to a determination that jobs are actively running on the target system and/or users are using the target system, outputting a second question to the first destination, wherein the second question requests input as to whether the active jobs and/or the active user use of the target system should be terminated to allow the IPL to be performed; and in response to a determination that jobs are not actively running on the target system and/or users are not using the target system, performing the IPL.

7. The computer-implemented method of claim 6, comprising:

receiving a first response corresponding to the first question;

in response to the first response indicating that the active jobs and/or the active user use of the target system should be terminated to allow the modification to be performed, terminating the active jobs and/or the active user use of the target system and performing the modification;

receiving a second response corresponding to the second question; and in response to the second response indicating that the active jobs and/or the active user use of the target system should be terminated to allow the IPL to be performed, terminating the active jobs and/or the active user use of the target system and performing the IPL.

8. A computer program product for outputting an interface that enables streamlined user-friendly initiation/control of modifications and/or initial program loading of a target system, the computer program product comprising a computer readable storage medium having program instructions embodied therewith, the program instructions readable and/or executable by a computer to cause the computer to:

output, by the computer, an interface to a first destination, wherein the interface includes a feature configured to accept user input;

receive, by the computer, a first input from a user;

parse, by the computer, contents of the first input;

determine, by the computer, using the parsed contents of the first input, whether the first input includes the following instances of information: a type of modification that is to be performed, a program that is to be incorporated in the performing of the modification, and a target system on which the modification is to be performed;

in response to a determination that the first input does not include one or more of the instances of information, output, by the computer, a request for the instance(s) of information not included in the first input; and in response to a determination that the first input includes the instances of information, perform, by the computer, a process, the process including:

correlating the instances of information to a script file that is pre-associated with the program indicated in the instances of information;

performing the modification in accordance with the instances of information of the first input by initiating running of the script file;

collecting status information detailing the modification being performed; and outputting the status information to the first destination.

9. The computer program product of claim 8, wherein the interface is configured to be visually output on a web browser, wherein the feature of the interface is a chat window, the program instructions readable and/or executable by the computer to cause the computer to: prior to outputting the status information, translate, by the computer, the status information to chat window dialogue that corresponds to the contents of the status information.

10. The computer program product of claim 8, wherein the type of modification that is to be performed is a modification selected from the group consisting of: installing an update that is associated with an error that was previously detected on the target system, and uninstalling an update that is associated with an error that was previously detected on the target system.

11. The computer program product of claim 8, wherein the type of modification that is to be performed is a modification selected from the group consisting of: updating a state of the program indicated in the instances of information, and reverting a state of the program indicated in the instances of information.

12. The computer program product of claim 8, wherein the collected status information includes one or more types of information selected from the group consisting of: a date and time at which the program that is to be incorporated in performance of the modification was previously received, maintenance operations that are scheduled to be performed before a next action is performed in accordance with performing the modification, macros that have been updated on the target system since initiating the script file, a time of completion of performing the modification, and identities of load modules that were amended during performance of the modification.

13. The computer program product of claim 8, the program instructions readable and/or executable by the computer to cause the computer to:

determine, by the computer, prior to performing the modification, whether jobs are actively running on the target system and/or users are using the target system;

in response to a determination that jobs are actively running on the target system and/or users are using the target system, output, by the computer, a first question to the first destination, wherein the first question requests input as to whether the active jobs and/or the active user use of the target system should be terminated to allow the modification to be performed;

in response to a determination that jobs are not actively running on the target system and/or users are not using the target system, perform, by the computer, the modification;

determine, by the computer, prior to performing an initial program load (IPL) of the program indicated in the instances of information, whether jobs are actively running on the target system and/or users are using the target system;

in response to a determination that jobs are actively running on the target system and/or users are using the target system, output, by the computer, a second question to the first destination, wherein the second question requests input as to whether the active jobs and/or the active user use of the target system should be terminated to allow the IPL to be performed; and in response to a determination that jobs are not actively running on the target system and/or users are not using the target system, perform, by the computer, the IPL.

14. The computer program product of claim 13, the program instructions readable and/or executable by the computer to cause the computer to:

receive, by the computer, a first response corresponding to the first question;

in response to the first response indicating that the active jobs and/or the active user use of the target system should be terminated to allow the modification to be performed, terminate, by the computer, the active jobs and/or the active user use of the target system and performing the modification;

receive, by the computer, a second response corresponding to the second question; and in response to the second response indicating that the active jobs and/or the active user use of the target system should be terminated to allow the IPL to be performed, terminate, by the computer, the active jobs and/or the active user use of the target system and performing the IPL.

15. A system, comprising:

a processor; and logic integrated with the processor, executable by the processor, or integrated with and executable by the processor, the logic being configured to:

output an interface to a first destination, wherein the interface includes a feature configured to accept user input;

receive a first input from a user;

parse contents of the first input;

determine, using the parsed contents of the first input, whether the first input includes the following instances of information: a type of modification that is to be performed, a program that is to be incorporated in the performing of the modification, and a target system on which the modification is to be performed;

in response to a determination that the first input does not include one or more of the instances of information, output a request for the instance(s) of information not included in the first input; and in response to a determination that the first input includes the instances of information, perform a process, the process including:

correlating the instances of information to a script file that is pre-associated with the program indicated in the instances of information;

performing the modification in accordance with the instances of information of the first input by initiating running of the script file;

collecting status information detailing the modification being performed; and outputting the status information to the first destination.

16. The system of claim 15, wherein the interface is configured to be visually output on a web browser, wherein the feature of the interface is a chat window, and the logic being configured to: prior to outputting the status information, translate the status information to chat window dialogue that corresponds to the contents of the status information.

17. The system of claim 15, wherein the type of modification that is to be performed is a modification selected from the group consisting of: installing an update that is associated with an error that was previously detected on the target system, and uninstalling an update that is associated with an error that was previously detected on the target system.

18. The system of claim 15, wherein the type of modification that is to be performed is a modification selected from the group consisting of: updating a state of the program indicated in the instances of information, and reverting a state of the program indicated in the instances of information.

19. The system of claim 15, wherein the collected status information includes one or more types of information selected from the group consisting of: a date and time at which the program that is to be incorporated in performance of the modification was previously received, maintenance operations that are scheduled to be performed before a next action is performed in accordance with performing the modification, macros that have been updated on the target system since initiating the script file, a time of completion of performing the modification, and identities of load modules that were amended during performance of the modification.

20. The system of claim 15, the logic being configured to:

determine, prior to performing the modification, whether jobs are actively running on the target system and/or users are using the target system;

in response to a determination that jobs are actively running on the target system and/or users are using the target system, output a first question to the first destination, wherein the first question requests input as to whether the active jobs and/or the active user use of the target system should be terminated to allow the modification to be performed;

in response to a determination that jobs are not actively running on the target system and/or users are not using the target system, perform the modification;

determine, prior to performing an initial program load (IPL) of the program indicated in the instances of information, whether jobs are actively running on the target system and/or users are using the target system;

in response to a determination that jobs are actively running on the target system and/or users are using the target system, outputting a second question to the first destination, wherein the second question requests input as to whether the active jobs and/or the active user use of the target system should be terminated to allow the IPL to be performed; and in response to a determination that jobs are not actively running on the target system and/or users are not using the target system, performing the IPL.

* * * * *